(12) United States Patent
Lv et al.

(10) Patent No.: US 12,547,560 B2
(45) Date of Patent: Feb. 10, 2026

(54) DATA INTERACTION METHOD, APPARATUS AND SYSTEM, AND ELECTRONIC DEVICE AND STORAGE MEDIUM

(71) Applicant: Shenzhen MicroBT Electronics Technology Co., Ltd.

(72) Inventors: Yongzhi Lv, Guangdong (CN); Hongxing Wan, Guangdong (CN); Zuoxing Yang, Guangdong (CN); Xiaoqiao Chen, Guangdong (CN); Zhongping Wang, Guangdong (CN)

(73) Assignee: Shenzhen MicroBT Electronics Technology Co., Ltd., Guangdong (CN)

( * ) Notice: Subject to any disclaimer, the term of this patent is extended or adjusted under 35 U.S.C. 154(b) by 0 days.

(21) Appl. No.: 18/844,766

(22) PCT Filed: May 17, 2023

(86) PCT No.: PCT/CN2023/094736
§ 371 (c)(1),
(2) Date: Sep. 6, 2024

(87) PCT Pub. No.: WO2024/037076
PCT Pub. Date: Feb. 22, 2024

(65) Prior Publication Data
US 2025/0110900 A1 Apr. 3, 2025

(30) Foreign Application Priority Data

Aug. 17, 2022 (CN) .......................... 202210985974.4

(51) Int. Cl.
*G06F 13/16* (2006.01)
*G06F 12/0802* (2016.01)

(52) U.S. Cl.
CPC ...... *G06F 13/1673* (2013.01); *G06F 12/0802* (2013.01)

(58) Field of Classification Search
CPC .......................... G06F 13/1673; G06F 12/0802
(Continued)

(56) References Cited

U.S. PATENT DOCUMENTS 6,912,557 B1 * 6/2005 North .................. G06F 7/57
708/490
11,403,045 B2 8/2022 Yun
(Continued)

FOREIGN PATENT DOCUMENTS

CN 102571280 A 7/2012
CN 103714038 A 4/2014
(Continued)

OTHER PUBLICATIONS

International Search Report of the International Searching Authority, issued in PCT/CN2023/094736, mailed Jun. 23, 2023; ISA/CN.

*Primary Examiner* — Titus Wong
(74) *Attorney, Agent, or Firm* — Harness, Dickey & Pierce, P.L.C.

(57) ABSTRACT

A data interaction method, apparatus and system, an electronic device, and a storage medium are disclosed. The method includes: obtaining, in response to a parameter writing operation signal, a first parameter and storing the first parameter in a downlink buffer; acquiring a second parameter from the downlink buffer and transmitting the second parameter to a data processing circuit unit, for the data processing circuit unit to process data based on the second parameter so as to obtain output data; storing the output data in an uplink buffer; recording the quantity of output data stored in the uplink buffer, and transmitting, when the quantity of the output data stored in the uplink buffer reaches an output quantity threshold, storage state (Continued)

information of the uplink buffer; and outputting the output data stored in the uplink buffer in bulk in response to a data reading operation instruction.

20 Claims, 8 Drawing Sheets

(58) Field of Classification Search
USPC .......................................................... 710/310
See application file for complete search history.

(56) References Cited

U.S. PATENT DOCUMENTS

| | | | |
|---|---|---|---|
| 2005/0047783 A1 | 3/2005 | Sisto et al. | |
| 2007/0273699 A1* | 11/2007 | Sasaki | G06F 9/3879 345/502 |
| 2008/0307121 A1* | 12/2008 | Chen | G06F 13/28 710/22 |
| 2010/0005199 A1* | 1/2010 | Gadgil | G06F 13/28 710/22 |
| 2012/0284585 A1* | 11/2012 | Yang | H04L 1/0065 714/755 |
| 2015/0106596 A1* | 4/2015 | Vorbach | G06F 9/3877 712/221 |
| 2018/0067889 A1* | 3/2018 | Brown | G06F 13/4221 |
| 2019/0253201 A1* | 8/2019 | Ye | H04L 1/1835 |
| 2022/0197710 A1* | 6/2022 | Sivaramakrishnan | G06F 9/5027 |
| 2022/0349417 A1* | 11/2022 | Linderman | G06F 13/404 |

FOREIGN PATENT DOCUMENTS

| | | |
|---|---|---|
| CN | 110162489 A | 8/2019 |
| CN | 112131164 A | 12/2020 |
| CN | 112783810 A | 5/2021 |
| CN | 113518044 A | 10/2021 |
| CN | 114205183 A | 3/2022 |
| CN | 115061959 A | 9/2022 |
| JP | 2000020716 A | 1/2000 |
| WO | WO-2018099014 A1 | 6/2018 |

* cited by examiner

DATA INTERACTION METHOD, APPARATUS AND SYSTEM, AND ELECTRONIC DEVICE AND STORAGE MEDIUM

CROSS-REFERENCE TO RELATED APPLICATIONS

This application is a 371 U.S. National Phase of International Application No. PCT/CN2023/094736, filed on May 17, 2023, which claims priority to Chinese Patent Application No. 202210985974.4, entitled "Data Interaction Method, Apparatus and System, and Electronic Device and Storage Medium", and filed to China National Intellectual Property Administration on Aug. 17, 2022, which is hereby incorporated by reference in their entirety.

TECHNICAL FIELD

The present disclosure relates to the technical field of data processing, in particular to a data interaction method, apparatus and system, an electronic device, and a storage medium.

BACKGROUND ART

Generally speaking, a complete set of embedded chip system includes a central processing unit (CPU), a storage unit, a bus interconnection structure, an intellectual property (IP) module, and the like. The IP module may also be referred to as an IP core. The normal operation of the IP module depends on the parameter configuration of the central processing unit, and the central processing unit also needs to acquire a current running state of the IP module and configure parameters (or opcodes) to the IP module at an appropriate time point.

SUMMARY OF THE INVENTION

Embodiments of the present disclosure disclose a data interaction method, apparatus and system, an electronic device, and a storage medium, so as to reduce the interaction frequency between an IP module used as a data processing circuit unit and the outside, avoid influence on the performance of the IP module caused by frequent interactions, and further improve the performance of the IP module.

The technical solutions of the present disclosure are implemented as follows.

A data interaction method includes:
 storing, in response to a parameter writing operation signal transmitted by a central processing unit, an obtained first parameter in a downlink buffer;
 acquiring a second parameter from the downlink buffer and transmitting the second parameter to a data processing circuit unit, for the data processing circuit unit to process data based on the second parameter so as to obtain output data corresponding to the second parameter;
 storing the output data corresponding to the second parameter in an uplink buffer;
 recording a quantity of output data stored in the uplink buffer, and transmitting, in response to that the quantity of the output data stored in the uplink buffer reaches an output quantity threshold, storage state information of the uplink buffer to trigger a data reading operation instruction, where the storage state information of the uplink buffer indicates that the uplink buffer is not capable of continuing to store subsequent new output data; and
 outputting the output data stored in the uplink buffer in bulk in response to the data reading operation instruction.

A data interaction apparatus includes a downlink writing circuit unit, a downlink buffering circuit unit, a downlink reading circuit unit, an uplink writing circuit unit, an uplink buffering circuit unit, an uplink state monitoring circuit unit, and an uplink read-out circuit unit.

The downlink writing circuit unit is configured to obtain, in response to a parameter writing operation signal transmitted by a central processing unit, a first parameter and store the first parameter in the downlink buffering circuit unit.

The downlink buffering circuit unit is electrically connected to the downlink writing circuit unit, and is configured to store the first parameter.

The downlink reading circuit unit is electrically connected to the downlink buffering circuit unit and a data processing circuit unit, and is configured to acquire a second parameter from the downlink buffering circuit unit and transmit the second parameter to the data processing circuit unit.

The uplink writing circuit unit is electrically connected to the data processing circuit unit, and is configured to store output data corresponding to the second parameter obtained by processing data through the data processing circuit unit based on the second parameter in the uplink buffering circuit unit.

The uplink buffering circuit unit is electrically connected to the uplink writing circuit unit, and is configured to store the output data corresponding to the second parameter.

The uplink state monitoring circuit unit is electrically connected to the uplink buffering circuit unit, and is configured to record a quantity of output data stored in the uplink buffering circuit unit, and transmit, in response to that the quantity of the output data stored in the uplink buffering circuit unit reaches an output quantity threshold, storage state information of the uplink buffering circuit unit to trigger a data reading operation instruction, where the storage state information of the uplink buffering circuit unit indicates that the uplink buffering circuit unit is not capable of continuing to store subsequent new output data.

The uplink read-out circuit unit is electrically connected to the uplink buffering circuit unit, and is configured to output the output data stored in the uplink buffering circuit unit in bulk in response to the data reading operation instruction.

A data interaction system includes:
 a central processing unit and the data interaction apparatus as described in any one of the foregoing which are communicatively connected through a bus.

The central processing unit is configured to transmit the parameter writing operation signal to the data interaction apparatus through the bus, transmit the data reading operation instruction to the data interaction apparatus in response to the received storage state information of the uplink buffering circuit unit, and receive the output data outputted in bulk by the uplink read-out circuit unit.

An electronic device includes:
 a processor; and
 a memory configured to store executable instructions of the processor,
 wherein the processor is configured to execute the executable instructions to implement the foregoing data interaction method.

Embodiments of the present disclosure also provide a non-volatile computer-readable storage medium. The storage medium stores machine-readable instructions. The machine-readable instructions may be executed by a processor to implement the foregoing method.

Embodiments of the present disclosure also provide a computer program product. The computer program product includes computer instructions. The computer instructions are stored in a computer-readable storage medium. The computer instructions, when executed, implement the foregoing data interaction method.

DETAILED DESCRIPTION OF THE INVENTION

In order that the objects, technical solutions and advantages of the present disclosure will become more apparent, the present disclosure will be further described in detail below with reference to the accompanying drawings.

It should be noted that "first", "second" and other terms in the description and claims of the present disclosure and in the foregoing drawings are used for distinguishing between similar objects and not necessarily used for describing a particular order or sequential order. It should be understood that data so used are interchangeable under appropriate circumstances, whereby embodiments of the present disclosure described herein can be implemented in orders other than those illustrated or described herein. The implementations described in the following exemplary embodiments are not representative of all implementations consistent with the present disclosure. Rather, the implementations are only examples of apparatuses and methods consistent with some aspects of the present disclosure as detailed in the appended claims.

In some embodiments, in an embedded chip system, the interactions between a central processing unit and an IP module are carried out by a register. The central processing unit configures parameters (or opcodes) to the IP module through a bus interconnection structure. After the IP module completes processing according to the configured parameters (or opcodes), relevant information obtained by processing is written into a state register. After the central processing unit queries the relevant information in the state register, a next round of parameter (or opcode) configuration is performed on the IP module by the central processing unit. With this interactive mode, the performance of the IP module with multiple parameters and high real-time requirements will be seriously limited by the limitation of the storage capacity of the register. Therefore, how to solve the influence on the performance of the IP module caused by the interactions between the IP module and the outside is an urgent problem to be solved.

In order to solve the foregoing technical problems, the present disclosure provides a data interaction method, apparatus and system, an electronic device, and a storage medium, which will be described in detail below.

Figure 1:
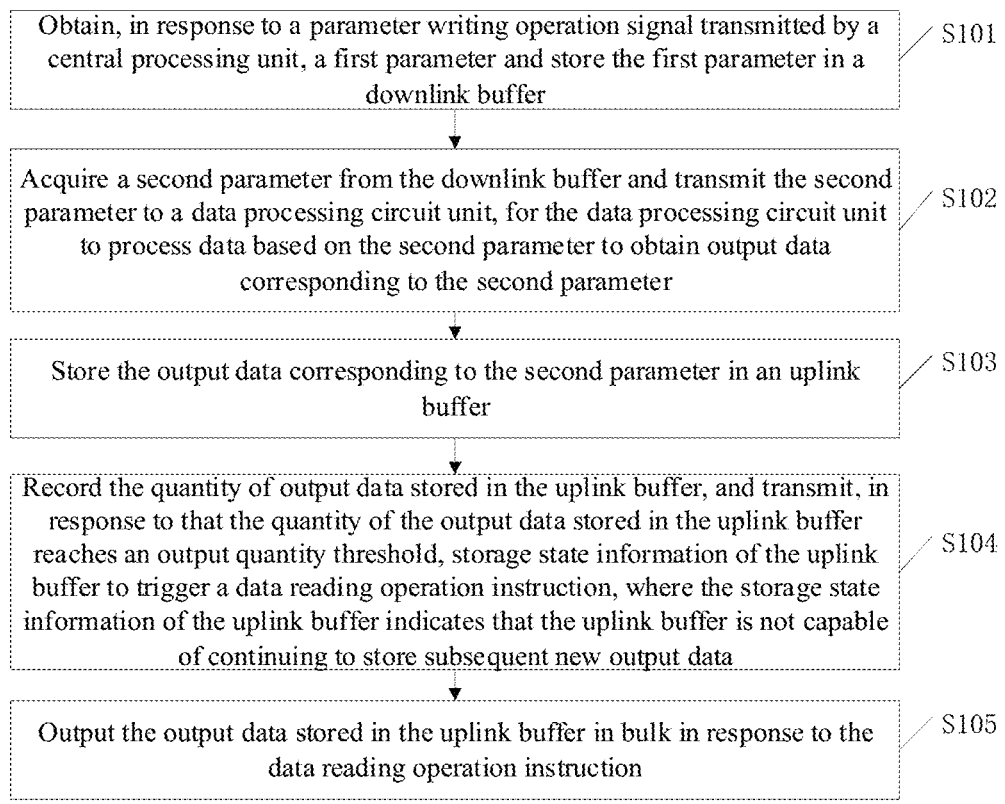
FIG. 1 is a flowchart of a data interaction method according to some exemplary embodiments.

FIG. 1 is a flowchart of a data interaction method according to some exemplary embodiments. As shown in FIG. 1, the data interaction method mainly includes the following operations S101 to S105.

S101: Obtain, in response to a parameter writing operation signal transmitted by a central processing unit, a first parameter and store the first parameter in a downlink buffer.

In some embodiments, the parameter writing operation signal comes from a bus. The parameter writing operation signal may be distributed by the central processing unit through the bus.

In the embodiments of the present disclosure, a direction of data flow from the outside (such as the central processing unit) to a data processing circuit unit is referred to as a downlink direction, and the downlink buffer is provided for the downlink direction. The downlink buffer is a cache region for storing parameters required by the data processing circuit unit to perform data processing.

S102: Acquire a second parameter from the downlink buffer and transmit the second parameter to a data processing circuit unit, for the data processing circuit unit to process data based on the second parameter to obtain output data corresponding to the second parameter.

In some embodiments, the data processing circuit unit may be an IP module. In the embodiments of the present disclosure, the first parameter is stored in the downlink buffer, and the data processing circuit unit acquires the second parameter from the downlink buffer.

In the embodiments of the present disclosure, the second parameter is further deleted from the downlink buffer after acquiring the second parameter from the downlink buffer and transmitting the second parameter to the data processing circuit unit.

In the embodiments of the present disclosure, by using the downlink buffer, the central processing unit only stores the first parameter in the downlink buffer, and the data processing circuit unit only acquires the second parameter from the downlink buffer, whereby the interactions between the central processing unit and the data processing circuit unit are reduced in the parameter transfer process, thereby reducing the frequency of the data processing circuit unit performing response operations in response to the external data interactions. Therefore, the data processing circuit unit has more time to process data, thereby avoiding the influence on the performance of the data processing circuit unit caused by frequent interactions and improving the performance of the data processing circuit unit.

S103: Store the output data corresponding to the second parameter in an uplink buffer.

In some embodiments, the output data corresponding to the second parameter includes result data obtained by data processing based on the second parameter and state information obtained during the data processing.

In the embodiments of the present disclosure, a direction of data flow from the data processing circuit unit to the outside (such as the central processing unit) is referred to as an uplink direction, and the uplink buffer is provided for the uplink direction. The uplink buffer is a cache region for storing output data obtained by performing data processing by the data processing circuit unit.

S104: Record the quantity of output data stored in the uplink buffer, and transmit, in response to that the quantity of the output data stored in the uplink buffer reaches an output quantity threshold, storage state information of the uplink buffer to trigger a data reading operation instruction, where the storage state information of the uplink buffer indicates that the uplink buffer is not capable of continuing to store subsequent new output data.

In some embodiments, the storage state information of the uplink buffer may be used for triggering a subject (such as the central processing unit) receiving the storage state information of the uplink buffer to issue a data reading operation instruction so as to acquire output data stored in the uplink buffer in bulk. For example, all the output data stored in the uplink buffer may be acquired at one time, or part of the data stored in the uplink buffer may be acquired. The central processing unit may be configured to issue the data reading operation instruction after receiving the storage state information of the uplink buffer.

In some embodiments, the storage state information of the uplink buffer is transmitted through the bus and acquired by the central processing unit. In this case, the central processing unit may acquire the output data stored in the uplink buffer in bulk, and the data processing circuit unit only stores the output data in the uplink buffer, whereby the interactions between the central processing unit and the data processing circuit unit are reduced in the process of uploading the output data from the data processing circuit unit, thereby reducing the frequency of interactions of the data processing circuit unit with the central processing unit for the output data. Therefore, the data processing circuit unit has more time to process data, thereby avoiding the influence on the performance of the data processing circuit unit caused by frequent interactions and improving the performance of the data processing circuit unit.

S105: Output the output data stored in the uplink buffer in bulk in response to the data reading operation instruction.

In the embodiments of the present disclosure, the output data outputted in bulk is further deleted from the uplink buffer after the output data stored in the uplink buffer is outputted in bulk.

In some embodiments, the data reading operation instruction originates from the bus. The data reading operation instruction may be issued by the central processing unit through the bus. In some embodiments, the output data is outputted through the bus. In some embodiments, the output data is outputted to the central processing unit. In some embodiments, the output data may also be outputted to a storage unit connected to the bus. Based on the foregoing, the output data stored in the uplink buffer is outputted in bulk in response to the data reading operation instruction, thereby realizing the bulk transmission of the output data, and reducing the frequency of interactions of the data processing circuit unit with the central processing unit for the output data. Therefore, the data processing circuit unit has more time to process data, thereby avoiding the influence on the performance of the data processing circuit unit caused by frequent interactions and improving the performance of the data processing circuit unit.

It should be noted that the central processing unit as a system scheduling core has a large amount of work to be processed. Generally speaking, in order to ensure the smooth and stable operation of the whole system, the interactions between the central processing unit and the data processing circuit unit need to be scheduled by the central processing unit. When a plurality of data processing circuit units exist simultaneously in the system, the central processing unit needs to continuously transmit parameters to the data processing circuit units and acquire respective output data from the data processing circuit units in order to ensure the data processing of the data processing circuit units without adopting the data interaction method according to an embodiment of the present disclosure. In this process, the central processing unit needs to continuously interact between the data processing circuit units, thereby greatly increasing the interaction time between the central processing unit and the data processing circuit units, making the data processing circuit units unable to fully release the data processing performance, and increasing the burden of the central processing unit due to frequent interactions between the data processing circuit units. In a case of adopting the data interaction method according to an embodiment of the present disclosure, the data processing circuit unit only needs to acquire the parameters required for data processing from the downlink buffer and store the output data in the uplink buffer, and does not need to interact with the central processing unit for acquiring the parameters and transmitting the output data, thereby reducing the interaction frequency between the data processing circuit unit and the central processing unit, and enabling the data processing circuit unit to fully release the data processing performance. In the output process of the output data, the central processing unit transmits the data reading operation instruction when the quantity of the output data stored in the uplink buffer reaches the output quantity threshold, and outputs the output data stored in the uplink buffer in bulk, thereby realizing a bulk output form of the output data, reducing the interaction frequency of the central processing unit in the process of outputting the output data from the data processing circuit unit, and helping to reduce the burden of the central processing unit.

Figure 2:
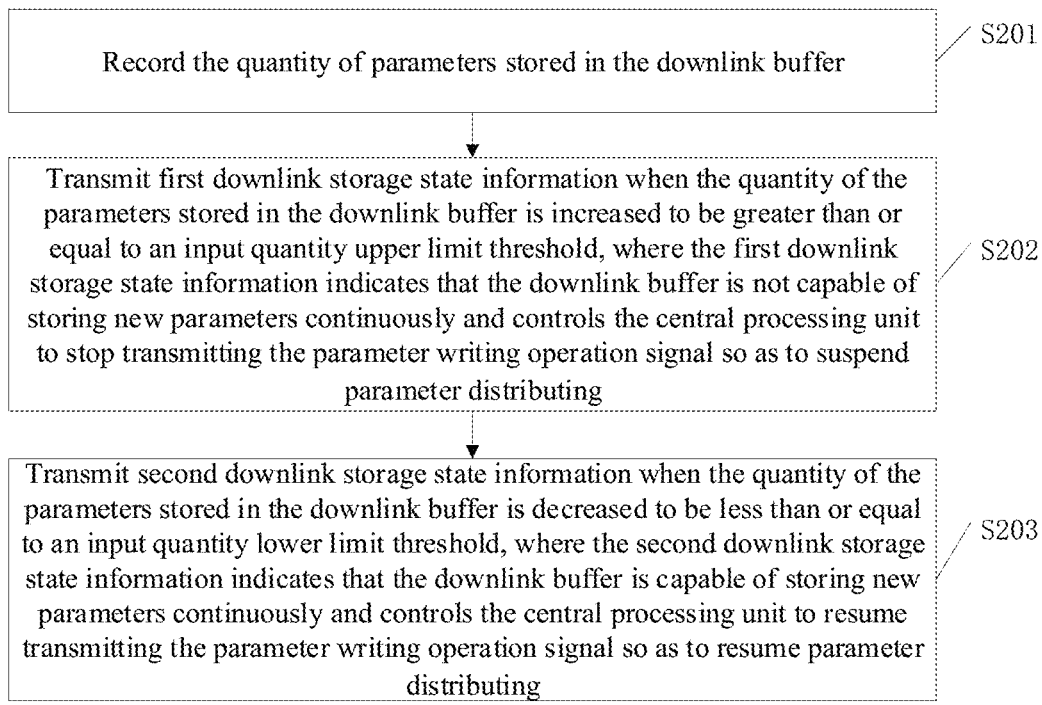
FIG. 2 is a flowchart of an embodiment of managing a downlink buffer according to some exemplary embodiments.

In addition to managing the quantity of the output data in the uplink buffer, in some embodiments, the data interaction method of the present disclosure may further include a management scheme for the quantity of parameters stored in the downlink buffer. FIG. 2 is a flowchart of an embodiment of managing a downlink buffer according to an exemplary embodiment. As shown in FIG. 2, the process includes the following operations S201 to S203.

S201: Record the quantity of parameters stored in the downlink buffer.

S202: Transmit first downlink storage state information when the quantity of the parameters stored in the downlink buffer is increased to be greater than or equal to an input quantity upper limit threshold, where the first downlink storage state information indicates that the downlink buffer is not capable of continuing to store subsequent new parameters, and controls the central processing unit to stop transmitting the parameter writing operation signal so as to suspend parameter distributing.

S203: Transmit second downlink storage state information when the quantity of the parameters stored in the downlink buffer is decreased to be less than or equal to an input quantity lower limit threshold, where the second downlink storage state information indicates that the downlink buffer is capable of continuing to store subsequent new parameters, and controls the central processing unit to resume transmitting the parameter writing operation signal so as to resume parameter distributing.

In some embodiments, the first downlink storage state information and the second downlink storage state information are transmitted through the bus. The first downlink storage state information characterizes that the quantity of parameters stored in the downlink buffer reaches the input quantity upper limit threshold. The second downlink storage state information characterizes that the quantity of parameters stored in the downlink buffer does not exceed the input quantity lower limit threshold.

By adopting the foregoing management manner for the downlink buffer and cooperating with the central processing unit to receive the first downlink storage state information and the second downlink storage state information and distribute parameters through the bus, the central processing unit can stop distributing the parameters after receiving the first downlink storage state information and continuously distribute the parameters after receiving the second downlink storage state information. Therefore, the central processing unit only needs to distribute the parameters based on the first downlink storage state information and the second downlink storage state information, thereby avoiding the frequent interactions with the data processing circuit unit to determine whether the data processing circuit unit needs to receive the parameters, and reducing the burden of the central processing unit.

In an embodiment in which the parameter writing operation signal originates from the bus and the parameter writing operation signal may be transmitted by the central processing unit through the bus, the signal transmission in the bus is performed according to a preset bus protocol, and there may be a problem of incompatibility between a parameter writing operation for the downlink buffer and an output data reading operation from the uplink buffer and the bus protocol. In this case, protocol conversion is required between the bus protocol and the parameter writing operation for the downlink buffer and between the output data reading operation from the uplink buffer and the bus protocol. Therefore, a process for protocol conversion may be further included in S101 and S105.

Figure 3:
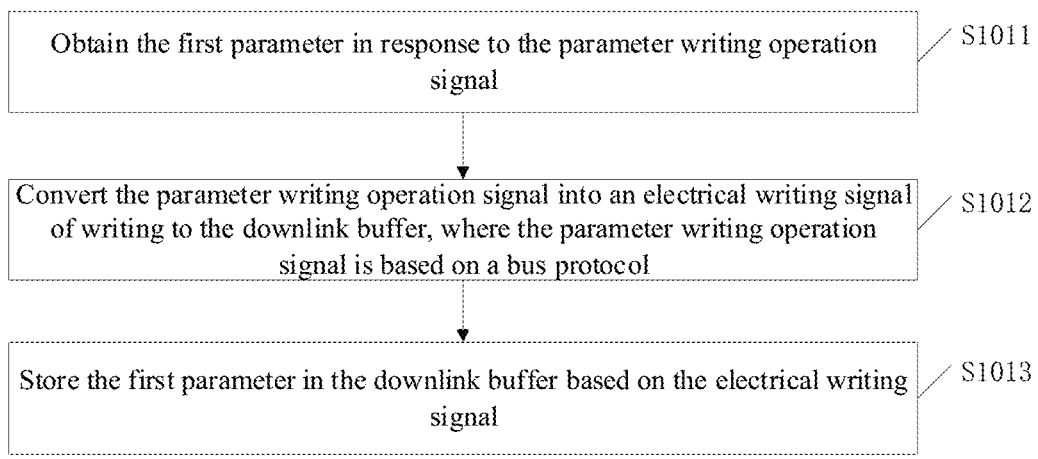
FIG. 3 is a flowchart of a parameter storage process according to some exemplary embodiments.

FIG. 3 is a flowchart of a parameter storage process according to an exemplary embodiment. As shown in FIG. 3, the obtaining, in response to a parameter writing operation signal, a first parameter and storing the first parameter in a downlink buffer in S101 includes:

S1011: Obtain the first parameter in response to the parameter writing operation signal.

S1012: Convert the parameter writing operation signal into an electrical writing signal of writing to the downlink buffer, where the parameter writing operation signal is based on a bus protocol.

S1013: Store the first parameter in the downlink buffer based on the electrical writing signal.

In some embodiments, the downlink buffer is a first input first output (FIFO) queue or a static random-access memory (SRAM). The FIFO queue has a FIFO write-read policy, which can ensure the consistency of the order of parameters written to the FIFO queue and read from the FIFO queue, and ensure that the order of data processing by the data processing circuit unit is not disturbed. The SRAM may be used to write and read parameters according to an address index, which can also ensure the consistency of the order of parameters written to the SRAM and read from the SRAM, and ensure that the order of data processing by the data processing circuit unit is not disturbed.

Figure 4:
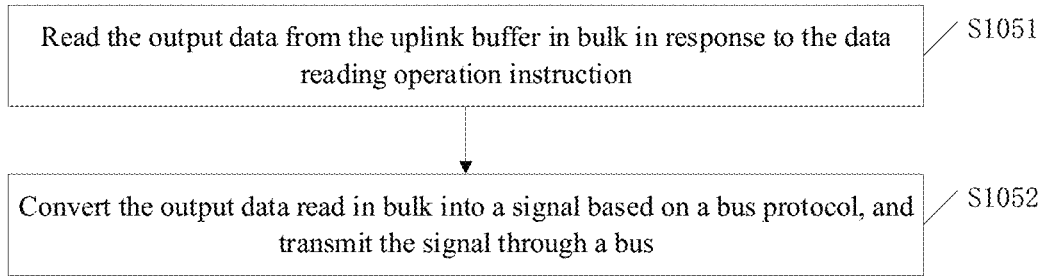
FIG. 4 is a flowchart of an output data output process according to some exemplary embodiments.

FIG. 4 is a flowchart of an output data output process according to an exemplary embodiment. As shown in FIG. 4, the outputting the output data stored in the uplink buffer in bulk in response to the data reading operation instruction in S105 includes:

S1051: Read the output data from the uplink buffer in bulk in response to the data reading operation instruction.

S1052: Convert the output data read in bulk into a signal based on a bus protocol, and transmit the signal through a bus.

In some embodiments, the uplink buffer may also be in the form of FIFO queue or SRAM.

In some embodiments, parameters may be acquired from the downlink buffer and transmitted to the data processing circuit unit in a variety of ways, including sequential reading, ping-pong buffering, and the like. The sequential reading refers to acquiring one (or a group of) parameter(s) in the downlink buffer and transmitting the parameters to the data processing circuit unit according to a specified order, such as an FIFO order. The data processing circuit unit processes data according to the obtained parameters. After the data processing is completed, a next (or next group of) parameter(s) in the downlink buffer are acquired and transmitted to the data processing circuit unit, and the data processing circuit unit processes data according to the obtained next (or next group of) parameter(s), and so on. However, in the sequential reading manner, there may be a problem that the data processing circuit unit cannot process data again for correction since the data processing circuit unit fails to process data and the parameters required for the data processing have been automatically deleted from the downlink buffer and cannot be obtained again. Therefore, in some embodiments, a ping-pong buffer is used to acquire the second parameter from the downlink buffer and transmit the second parameter to the data processing circuit unit.

In some embodiments, the acquiring a second parameter from the downlink buffer and transmitting the second parameter to a data processing circuit unit in S102 further includes:
  acquiring the second parameter from the downlink buffer, storing the second parameter in a ping-pong buffer, acquiring the second parameter from the ping-pong buffer, and transmitting the second parameter to the data processing circuit unit.

In some embodiments, the ping-pong buffer includes two cache regions. Any one of the two cache regions is a first cache region, and the other cache region other than the first cache region in the two cache regions is a second cache region. The two cache regions are configured to store different parameters respectively.

Figure 5:
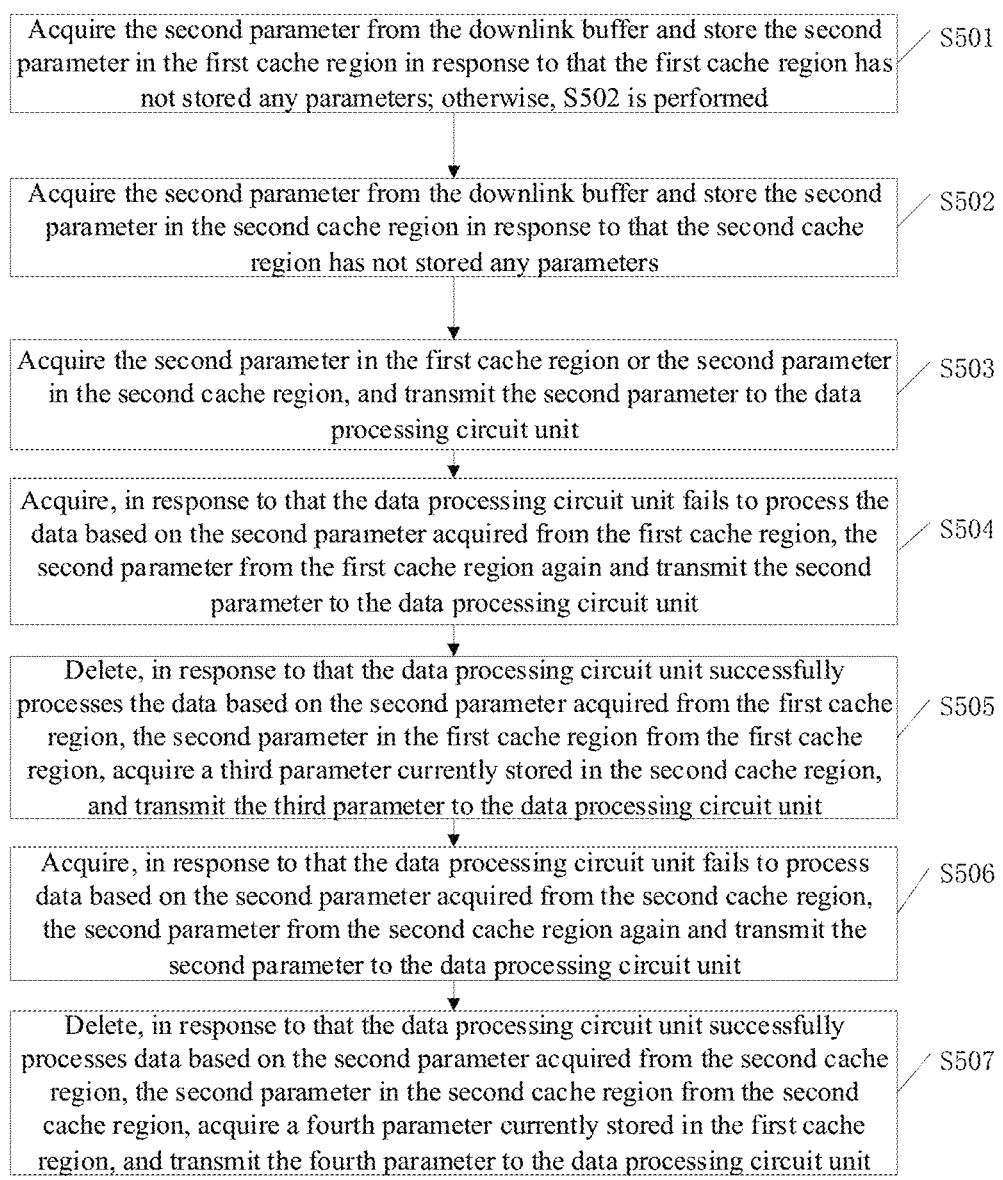
FIG. 5 is a flowchart of parameter transmission in a ping-pong buffer manner according to some exemplary embodiments.

FIG. 5 is a flowchart of parameter transmission in a ping-pong buffer manner according to an exemplary embodiment. As shown in FIG. 5, based on an embodiment in which the ping-pong buffer includes two cache regions, the acquiring the second parameter from the downlink buffer and storing the second parameter in a ping-pong buffer further includes:

S501: Acquire the second parameter from the downlink buffer and store the second parameter in the first cache region in response to that the first cache region has not stored any parameters; otherwise, S502 is performed.

S502: Acquire the second parameter from the downlink buffer and store the second parameter in the second cache region in response to that the second cache region has not stored any parameters.

Based on the foregoing, the problem that the current parameters are not executed correctly and the parameters are lost due to the abnormality of the data processing circuit unit can be avoided.

Specifically, with continued reference to FIG. 5, the data interaction method according to an embodiment of the present disclosure further includes the following operations S503 to S507.

S503: Acquire the second parameter in the first cache region or the second parameter in the second cache region, and transmit the second parameter to the data processing circuit unit.

S504: Acquire, in response to that the data processing circuit unit fails to process the data based on the second parameter acquired from the first cache region, the second parameter from the first cache region again and transmit the second parameter to the data processing circuit unit.

S505: Delete, in response to that the data processing circuit unit successfully processes the data based on the second parameter acquired from the first cache region, the second parameter in the first cache region from the first cache region, acquire a third parameter currently stored in the second cache region, and transmit the third parameter to the data processing circuit unit.

S506: Acquire, in response to that the data processing circuit unit fails to process data based on the second parameter acquired from the second cache region, the second parameter from the second cache region again and transmit the second parameter to the data processing circuit unit.

S507: Delete, in response to that the data processing circuit unit successfully processes data based on the second parameter acquired from the second cache region, the second parameter in the second cache region from the second cache region, acquire a fourth parameter currently stored in the first cache region, and transmit the fourth parameter to the data processing circuit unit.

And so on.

Figure 6:
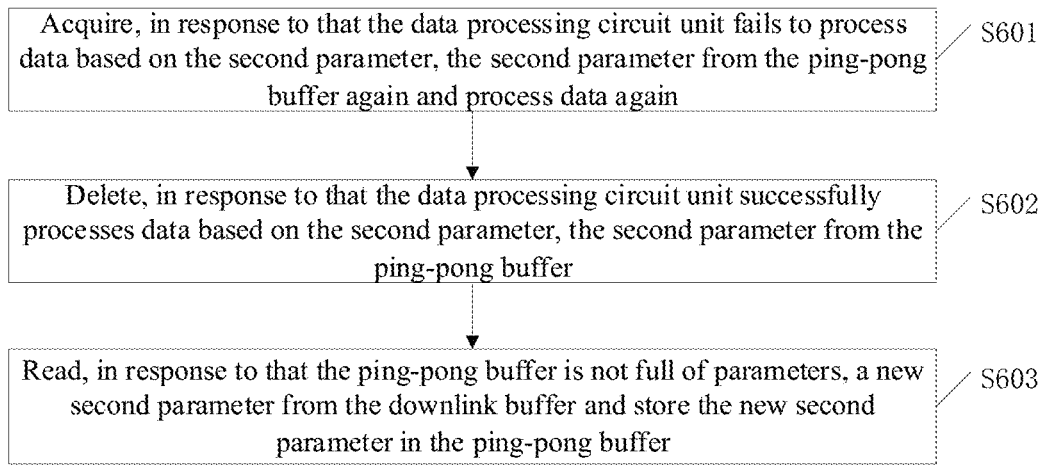
FIG. 6 is a flowchart of a process in a case of data processing failure in a ping-pong buffer manner according to some exemplary embodiments.

FIG. 6 is a flowchart of a process in a case of data processing failure in a ping-pong buffer manner according to an exemplary embodiment. As shown in FIG. 6, based on the ping-pong buffer, the data interaction method according to an embodiment of the present disclosure may further include the following operations S601 to S603.

S601: Acquire, in response to that the data processing circuit unit fails to process data based on the second parameter, the second parameter from the ping-pong buffer again and process data again.

S602: Delete, in response to that the data processing circuit unit successfully processes data based on the second parameter, the second parameter from the ping-pong buffer. Alternatively, S603: Read, in response to that the ping-pong buffer is not full of parameters, a new second parameter from the downlink buffer and store the new second parameter in the ping-pong buffer.

In some embodiments, whether the data processing circuit unit fails to process data may be determined by the data processing circuit unit. For example, the data processing circuit unit may acquire an execution state by information of a state flag bit thereof, so as to determine whether the data processing failed. The execution state may be set according to whether the data processing circuit unit completes the data processing.

Figure 7:
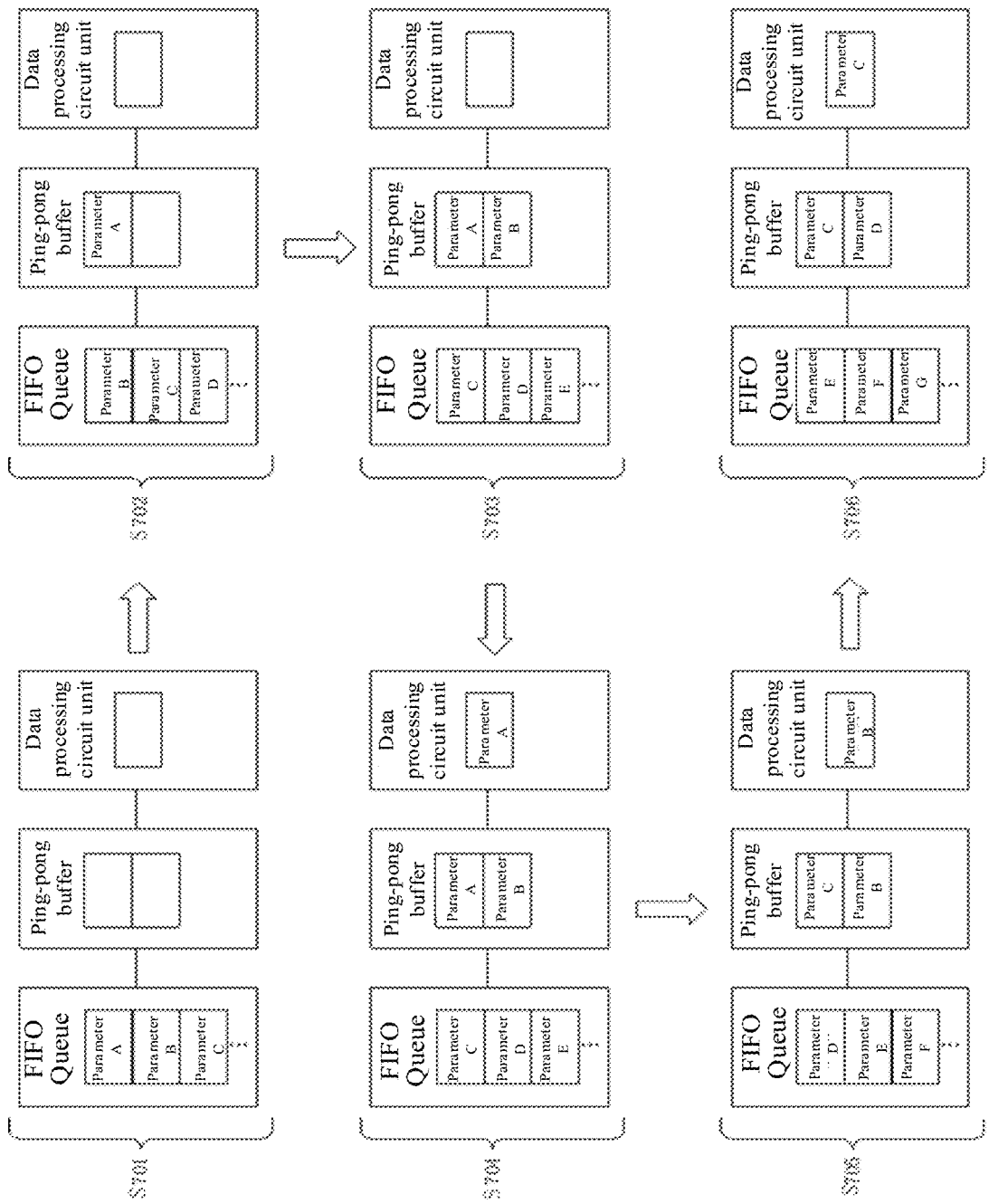
FIG. 7 is a schematic diagram of a cache change for parameter transmission in a ping-pong buffer manner according to some exemplary embodiments.

FIG. 7 is a schematic diagram of a cache change for parameter transmission in a ping-pong buffer manner according to an exemplary embodiment. As shown in FIG. 7, the change process is as follows.

In a change state of S701, parameters A, B, C and the like are sequentially stored in an FIFO queue.

In a change state of S702, parameter A in the FIFO queue enters a cache position in the ping-pong buffer, and a next parameter in the FIFO queue to be transmitted to the ping-pong buffer is parameter B. At this moment, parameter A is deleted from the FIFO queue since this parameter has entered the ping-pong buffer.

In a change state of S703, parameter B in the FIFO queue enters another cache position in the ping-pong buffer, and a next parameter in the FIFO queue to be transmitted to the ping-pong buffer is parameter C. At this moment, parameter B is deleted from the FIFO queue since this parameter has entered the ping-pong buffer.

In a change state of S704, parameter A is acquired from the ping-pong buffer and transmitted to the data processing circuit unit, and the data processing circuit unit processes data based on parameter A. At this moment, parameter A is not deleted from the ping-pong buffer. In a case that the data processing circuit unit fails to process data based on parameter A, since parameter A is still stored in the ping-pong buffer, the data processing circuit unit may still obtain parameter A and process data based on parameter A again. In a case that the data processing circuit unit normally processes data based on parameter A without failure, the process may proceed to S705.

In a change state of S705, in the case that the data processing circuit unit normally processes data based on parameter A without failure, parameter B is acquired from the ping-pong buffer and transmitted to the data processing circuit unit. The data processing circuit unit processes data based on parameter B. At this moment, parameter B is not deleted from the ping-pong buffer. Parameter C in the FIFO queue enters the cache position where the original parameter A is located in the ping-pong buffer, and a next parameter in the FIFO queue to be transmitted to the ping-pong buffer is parameter D. At this moment, parameter C is deleted from the FIFO queue since this parameter has entered the ping-pong buffer. In a case that the data processing circuit unit fails to process data based on parameter B, since parameter B is still stored in the ping-pong buffer, the data processing circuit unit may still obtain parameter B and process data based on parameter B again. In a case that the data processing circuit unit normally processes data based on parameter B without failure, the process may proceed to S706.

In a change state of S706, in the case that the data processing circuit unit normally processes data based on parameter B without failure, parameter C is acquired from the ping-pong buffer and transmitted to the data processing circuit unit. The data processing circuit unit processes data based on parameter C. At this moment, parameter C is not deleted from the ping-pong buffer. Parameter D in the FIFO queue enters the cache position where the original parameter B is located in the ping-pong buffer, and a next parameter in the FIFO queue to be transmitted to the ping-pong buffer is parameter E. At this moment, parameter D is deleted from the FIFO queue since this parameter has entered the ping-pong buffer. In a case that the data processing circuit unit fails to process data based on parameter C, since parameter C is still stored in the ping-pong buffer, the data processing circuit unit may still obtain parameter C and process data based on parameter C again. In a case that the data processing circuit unit normally processes data based on parameter C without failure, the data processing circuit unit may acquire parameters such as parameter D, parameter E, parameter F, and parameter G according to the above description.

The failure of data processing may mean that the data processing result is wrong. For example, the data processing is terminated without completion due to various reasons during the data processing, resulting in the data processing result being wrong.

Parameter A, parameter B, parameter C, parameter D, parameter E, parameter F, and parameter G are only named for distinguishing between different parameters. Taking parameter A as an example, parameter A may represent a parameter or a group of parameters, and parameter A represents a combination of all parameters required by the data processing circuit unit for data processing. All parameters are set according to the function and application environment of a specific data processing circuit unit, and the parameter may be one or more parameters.

The data interaction method according to an embodiment of the present disclosure can reduce the interaction frequency between the data processing circuit unit and the outside in the data interaction process in the downlink direction from the outside to the data processing circuit unit and the uplink direction from the data processing circuit unit to the outside, which is helpful to avoid the influence on the performance of the data processing circuit unit caused by frequent interactions and to improve the performance of the data processing circuit unit. Specifically, a downlink buffer hardware manner is adopted in the downlink direction from the outside to the data processing circuit unit, so as to store parameters required for data processing by the data processing circuit unit. The data processing circuit unit directly obtains the parameters from the downlink buffer for data processing without interacting with the outside, thereby reducing the frequency of interactions with the outside for acquiring parameters. In addition, an uplink buffer hardware manner is adopted in the uplink direction from the data processing circuit unit to the outside, so as to store the output data outputted by the data processing circuit unit and transmit the output data to the outside in bulk when the quantity of data in the uplink buffer reaches the output quantity threshold. The data processing unit does not need to interact with the outside for each output data, whereby the frequency of interactions between the data processing unit and the outside for outputting the output data can be reduced, and the frequency of interactions between the data processing unit and the outside for obtaining parameters and outputting the output data can be reduced, which is helpful to avoid the influence on the performance of the data processing circuit unit caused by frequent interaction and to improve the performance of the data processing circuit unit. In some embodiments, the downlink buffer adopts an FIFO manner, whereby the data processing circuit unit can sequentially process data according to the order in which the parameters are provided, thereby avoiding confusion in the data processing process. In addition, parameters are provided from the downlink buffer to the data processing circuit unit in a ping-pong buffer manner, whereby the data processing circuit unit can obtain the parameters about incorrect data processing and process data again in a case that the data is not correctly processed, thereby ensuring the correctness of the output data.

Figure 8:
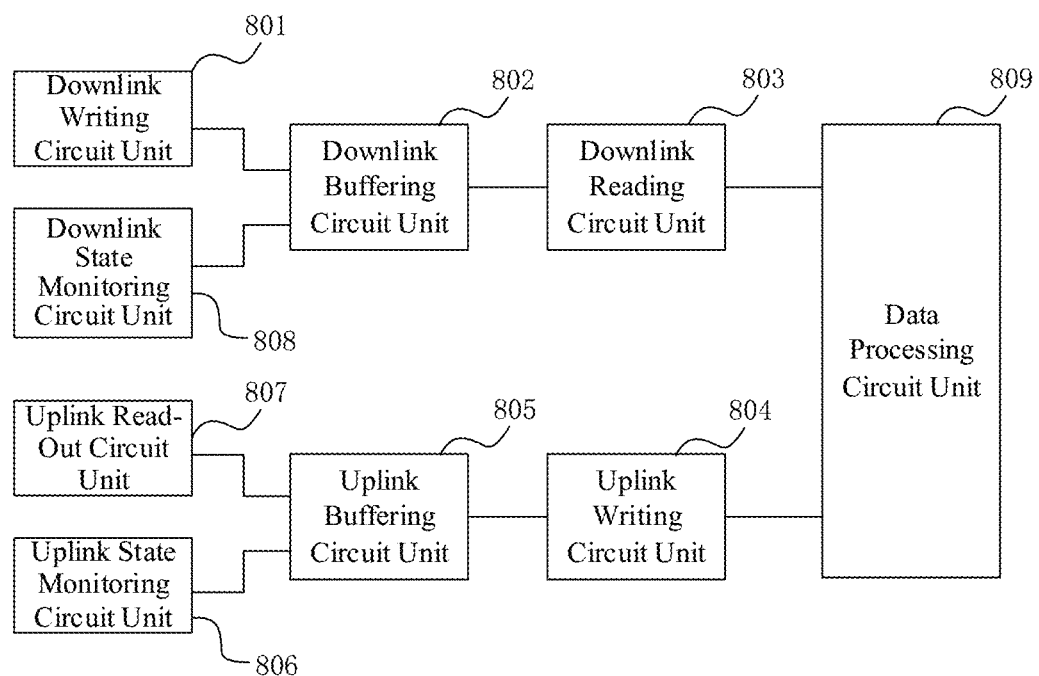
FIG. 8 is a schematic diagram of a data interaction apparatus according to some exemplary embodiments.

FIG. 8 is a schematic diagram of a data interaction apparatus according to an exemplary embodiment. As shown in FIG. 8, the data interaction apparatus includes a downlink writing circuit unit 801, a downlink buffering circuit unit 802, a downlink reading circuit unit 803, an uplink writing circuit unit 804, an uplink buffering circuit unit 805, an uplink state monitoring circuit unit 806, and an uplink read-out circuit unit 807. Further, a data interaction apparatus according to another exemplary embodiment further includes a data processing circuit unit 809. The following is a clear description of an interaction process between the data interaction apparatus and the data processing circuit unit 809 and a detailed description in conjunction with modules.

The downlink writing circuit unit 801 is configured to obtain, in response to a parameter writing operation signal transmitted by a central processing unit, a first parameter and store the first parameter in the downlink buffering circuit unit 802. In some embodiments, the downlink writing circuit unit 801 is communicatively connected to a bus. A parameter writing operation signal and a first parameter originate from the bus. In some embodiments, the parameter writing operation signal and the first parameter may be distributed by the central processing unit through the bus.

The downlink buffering circuit unit 802 is electrically connected to the downlink writing circuit unit 801, and is configured to store the first parameter. In some embodiments, the downlink buffering circuit unit 802 is an SRAM. In some embodiments, the downlink buffering circuit unit 802 stores the first parameter in an FIFO buffering manner.

The downlink reading circuit unit 803 is electrically connected to the downlink buffering circuit unit 802 and the data processing circuit unit 809. The downlink reading circuit unit 803 is configured to acquire a second parameter from the downlink buffering circuit unit 802 and transmit the second parameter to the data processing circuit unit 809.

The uplink writing circuit unit 804 is electrically connected to the data processing circuit unit 809. The uplink writing circuit unit 804 is configured to store output data obtained from the data processing circuit unit 809 in the uplink buffering circuit unit 805.

The uplink buffering circuit unit 805 is electrically connected to the uplink writing circuit unit 804. The uplink buffering circuit unit 805 is configured to store the output data.

The uplink state monitoring circuit unit 806 is electrically connected to the uplink buffering circuit unit 805, and is configured to record a quantity of output data stored in the uplink buffering circuit unit 805, and transmit, in response to that the quantity of the output data stored in the uplink buffering circuit unit 805 reaches an output quantity threshold, storage state information of the uplink buffering circuit unit 805 to trigger a data reading operation instruction. The storage state information of the uplink buffering circuit unit 805 indicates that the uplink buffering circuit unit 805 is not capable of continuing to store subsequent new output data. In some embodiments, the uplink state monitoring circuit unit 806 is communicatively connected to the bus and transmits the storage state information of the uplink buffering circuit unit 805 through the bus. In some embodiments, the storage state information of the uplink buffering circuit unit 805 is acquired by the central processing unit, thereby triggering the central processing unit to issue the data reading operation instruction.

The uplink read-out circuit unit 807 is electrically connected to the uplink buffering circuit unit 805. The uplink read-out circuit unit 807 is configured to output the output data stored in the uplink buffering circuit unit 805 in bulk in response to the data reading operation instruction. In some embodiments, the uplink read-out circuit unit 807 is communicatively connected to the bus. The data reading operation instruction originates from the bus. In some embodiments, the data reading operation instruction may be issued by the central processing unit through the bus. The output data may be outputted through the bus, and the output data may be received by the central processing unit or by a storage unit connected to the bus.

In some embodiments, the data processing circuit unit 809 is configured to process data based on the second parameter to obtain output data corresponding to the second parameter, and transmit the output data corresponding to the second parameter to the uplink writing circuit unit 804.

With continued reference to FIG. 8, in some embodiments, the data interaction apparatus further includes a downlink state monitoring circuit unit 808. The downlink state monitoring circuit unit 808 is electrically connected to the downlink buffering circuit unit 802. In some embodiments, the downlink state monitoring circuit unit 808 is communicatively connected to the bus.

The downlink state monitoring circuit unit 808 is configured to: record a quantity of parameters stored in the downlink buffering circuit unit 802; transmit first downlink storage state information in response to that the quantity of the parameters stored in the downlink buffering circuit unit 802 is greater than or equal to an input quantity upper limit threshold instead of being less than the input quantity upper limit threshold; and transmit second downlink storage state information in response to that the quantity of the parameters stored in the downlink buffering circuit unit 802 is less than or equal to an input quantity lower limit threshold instead of being greater than the input quantity lower limit threshold. The first downlink storage state information indicates that the downlink buffering circuit unit 802 is not capable of continuing to store subsequent new parameters, and controls the central processing unit to stop transmitting the parameter writing operation signal so as to suspend parameter distributing. The second downlink storage state information indicates that the downlink buffering circuit unit 802 is capable of continuing to store subsequent new parameters, and controls the central processing unit to resume transmitting the parameter writing operation signal so as to resume parameter distributing.

In some embodiments, the downlink state monitoring circuit unit 808 transmits the first downlink storage state information and the second downlink storage state information through the bus.

The downlink state monitoring circuit unit 808 adopts the foregoing management manner for the downlink buffering circuit unit 802, and cooperates with the central processing unit to receive the first downlink storage state information and the second downlink storage state information and distribute parameters through the bus, whereby the central processing unit can stop distributing the parameters after receiving the first downlink storage state information and resume distributing the parameters after receiving the second downlink storage state information. Therefore, the central processing unit only needs to distribute the parameters based on the first downlink storage state information and the second downlink storage state information, thereby avoiding the frequent interactions between the central processing unit and the data processing circuit unit 809 to determine whether the data processing circuit unit 809 needs to receive the parameters, and reducing the burden of the central processing unit.

In some embodiments, the downlink reading circuit unit 803 includes a downlink reading control sub-circuit unit and a ping-pong buffer sub-circuit unit. The downlink reading control sub-circuit unit is configured to acquire the second parameter from the downlink buffering circuit unit 802, store the second parameter in the ping-pong buffer sub-circuit unit, acquire the second parameter from the ping-pong buffer sub-circuit unit, and transmit the second parameter to the data processing circuit unit 809.

In some embodiments, the ping-pong buffer sub-circuit unit includes two cache regions: a first cache region and a second cache region. The two cache regions are configured to store different parameters respectively. The downlink reading control sub-circuit unit is further configured to:
  acquire the second parameter from the downlink buffering circuit unit 802 and store the second parameter in the first cache region in response to that the first cache region has not stored any parameters; otherwise,
  acquire the second parameter from the downlink buffering circuit unit 802 and store the second parameter in the second cache region in response to that the second cache region has not stored any parameters.

In some embodiments, the downlink reading circuit unit 803 is further configured to:
  acquire, in response to that the data processing circuit unit 809 fails to process the data based on the second parameter acquired from the first cache region, the second parameter from the first cache region again and transmit the second parameter to the data processing circuit unit 809;
  delete, in response to that the data processing circuit unit 809 successfully processes the data based on the second parameter acquired from the first cache region, the second parameter in the first cache region from the first cache region, acquire a third parameter currently stored in the second cache region, and transmit the third parameter to the data processing circuit unit 809;
  acquire, in response to that the data processing circuit unit 809 fails to process the data based on the second parameter acquired from the second cache region, the second parameter from the second cache region again and transmit the second parameter to the data processing circuit unit 809; and
  delete, in response to that the data processing circuit unit 809 successfully processes the data based on the second parameter acquired from the second cache region, the second parameter in the second cache region from the second cache region, acquire a fourth parameter currently stored in the first cache region, and transmit the fourth parameter to the data processing circuit unit 809.

In some embodiments, the downlink reading circuit unit 803 is also configured to:
  acquire, in a case that the data processing circuit unit 809 fails to process data based on the second parameter, the second parameter from the ping-pong buffer sub-circuit unit again and transmit the second parameter to the data processing circuit unit 809;
  delete, in a case that the data processing circuit unit 809 successfully processes data based on the second parameter, the second parameter from the ping-pong buffer sub-circuit unit; and
  read, in a case that the ping-pong buffer sub-circuit unit is not full of parameters, a new second parameter from the downlink buffering circuit unit 802 and store the new second parameter in the ping-pong buffer sub-circuit unit.

In the data interaction apparatus according to an embodiment of the present disclosure, the downlink writing circuit unit 801, the downlink buffering circuit unit 802, the downlink reading circuit unit 803, the uplink writing circuit unit 804, the uplink buffering circuit unit 805, the uplink state monitoring circuit unit 806, the uplink read-out circuit unit 807, and the downlink state monitoring circuit unit 808 are all in the form of hardware circuit modules. The data processing circuit unit 809 is also in the form of a hardware circuit module. The data processing circuit unit 809 may be an IP module alone or may be formed together with other modules as an IP module. The downlink writing circuit unit 801, the downlink buffering circuit unit 802, the downlink reading circuit unit 803, the uplink writing circuit unit 804, the uplink buffering circuit unit 805, the uplink state monitoring circuit unit 806, the uplink read-out circuit unit 807, and the downlink state monitoring circuit unit 808 may each exist as an independent IP module.

With regard to the data interaction apparatus in the foregoing embodiment, the specific manner in which the respective units perform operations has been described in detail in the embodiment of the data interaction method and will not be explained in detail herein.

Figure 9:
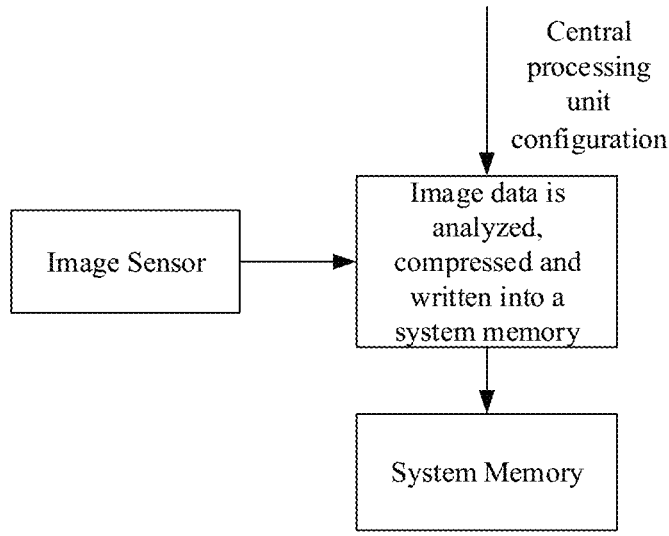
FIG. 9 is a schematic diagram of an application scenario of a data interaction method and apparatus according to some exemplary embodiments.

FIG. 9 is a schematic diagram of an application scenario of a data interaction method and apparatus according to an exemplary embodiment. As shown in FIG. 9, the application scenario is an application scenario for image compression of image data of an image sensor in a system on chip (SOC). The data processing circuit unit 809 is configured for the image compression of the image data of the image sensor in conjunction with the data interaction apparatus shown in FIG. 8. In this application scenario, the downlink buffering circuit unit 802 stores parameters in an FIFO buffering manner, and the downlink reading circuit unit 803 adopts a ping-pong buffer policy.

In an image acquisition system, the image data acquired by the image sensor will be analyzed after being transmitted to the SOC, and then written into a system memory through a direct memory access (DMA) channel after being compressed. As shown in FIG. 8, the compressed image data and the parameters written into a system memory address are written into the downlink buffering circuit unit 802 by the central processing unit through the downlink writing circuit unit 801. When vsync (frame header) of the image data arrives, the downlink reading circuit unit 803 reads the parameter from the FIFO queue of the downlink buffering circuit unit 802 and transmits the parameter to the data processing circuit unit 809. The data processing circuit unit 809 starts the compression processing of the current frame data. After the compression processing is completed, the data processing circuit unit 809 feeds back a message of completion to the downlink reading circuit unit 803, and stores the output data (image compression data and state information) obtained after the compression processing in the uplink buffering circuit unit 805 through the uplink writing circuit unit 804 for uploading by the uplink read-out circuit unit 807.

If the image data outputted by the data processing circuit unit 809 during the compression processing is incomplete since the image sensor is disturbed by an external environment, the data processing circuit unit 809 compresses the data incorrectly or the DMA channel cannot correctly write the data into the system memory, and then parameters corresponding to incomplete frames may be wasted or lost. To avoid this situation, the downlink reading circuit unit 803 adopts a ping-pong buffer policy. The downlink reading circuit unit 803 first reads a first (group of) parameter(s) from the downlink buffering circuit unit 802 to a first sub-buffer position in the ping-pong buffer, and transmits the first (group of) parameter(s) into the data processing circuit unit 804. Then the downlink reading circuit unit 803 reads a second (group of) parameter(s) from the downlink buffering circuit unit 802 to a second sub-buffer position in the ping-pong buffer. If the data processing circuit unit 809 returns that the first (group of) parameter(s) is executed correctly, the downlink reading circuit unit 803 transmits the second (group of) parameter(s) at the second sub-buffer position into the data processing circuit unit 809, and then reads a third (group of) parameter(s) from the downlink buffering circuit unit 802 to the first sub-buffer position in the ping-pong buffer. If the data processing circuit unit 809 returns that the first (group of) parameter(s) is executed incorrectly, the downlink reading circuit unit 803 transmits the first (group of) parameter(s) at the first sub-buffer position into the data processing circuit unit 809 again, thereby ensuring the correctness of the output data and avoiding the missing execution of the parameters in the downlink buffering circuit unit 802.

Figure 10:
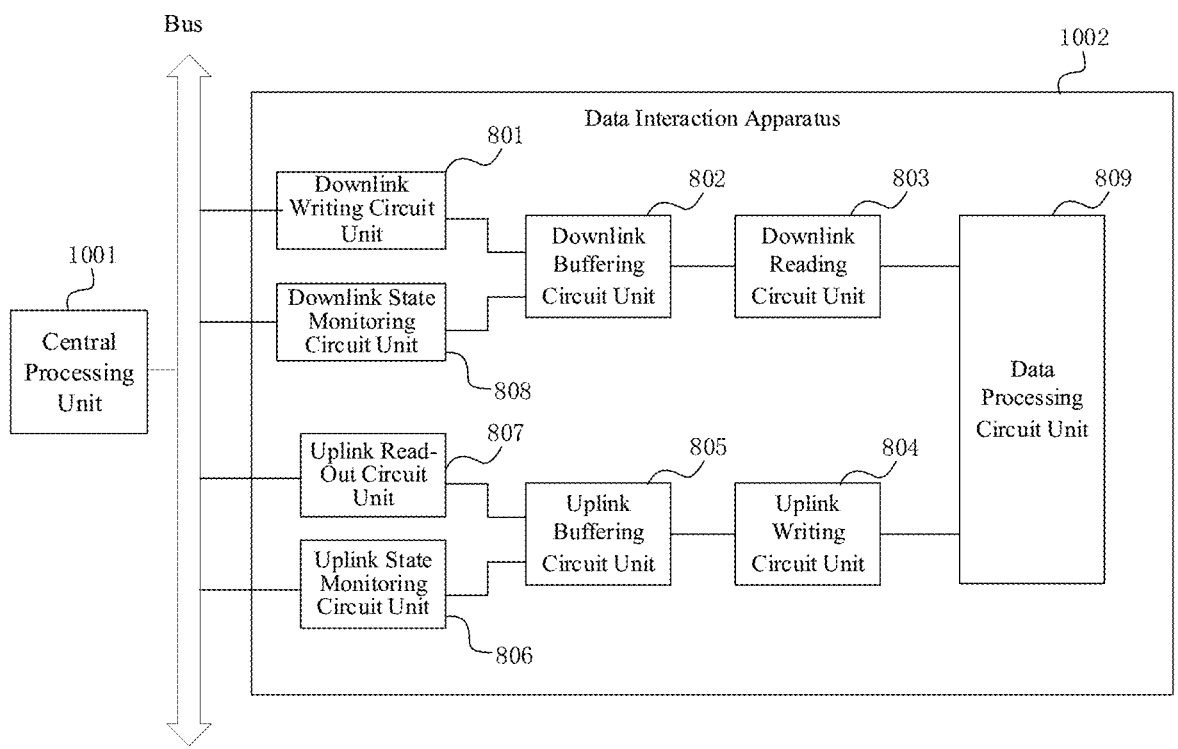
FIG. 10 is a schematic diagram of a data interaction system according to some exemplary embodiments.

FIG. 10 is a schematic diagram of a data interaction system according to some exemplary embodiments. As shown in FIG. 10, the data interaction system includes a central processing unit 1001 and a data interaction apparatus 1002 which are communicatively connected through a bus. The data interaction apparatus 1002 is the data interaction apparatus according to any one of the foregoing embodiments. The central processing unit 1001 is configured to transmit a parameter writing operation signal to the data interaction apparatus 1002 through the bus, transmit a data reading operation instruction to the data interaction apparatus 1002 in response to the received storage state information of the uplink buffering circuit unit 805, and receive the output data outputted in bulk by the uplink read-out circuit unit 807.

In some embodiments, the central processing unit 1001 is further configured to stop transmitting the parameter writing operation signal to the data interaction apparatus 1002 upon receiving first downlink storage state information, and continuously transmit the parameter writing operation signal to the interaction apparatus 1002 upon receiving second downlink storage state information.

Figure 11:
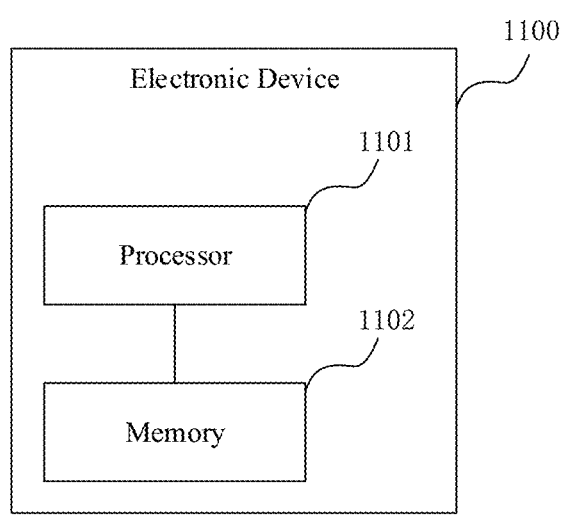
FIG. 11 is a schematic structural diagram of an electronic device according to some exemplary embodiments.

FIG. 11 is a schematic structural diagram of an electronic device according to an embodiment of the present disclosure. In some embodiments, the electronic device is a server. The electronic device 1100 may generate relatively large differences due to different configurations or performances, and may include one or more central processing units (CPUs) 1101 and one or more memories 1102. The memory 1102 stores at least one program code. The at least one program code is loaded and executed by the processor 1101 to implement the data interaction method provided by the foregoing embodiments. Definitely, the electronic device 1100 may also have components such as a wired or wireless network interface, a keyboard, and an input output interface for input and output. The electronic device 1100 may also include other components for implementing device functions, which will not be described in detail herein.

In an exemplary embodiment, there is also provided a computer-readable storage medium including at least one instruction, such as a memory including at least one instruction. The at least one instruction is executable by a processor in a computer device to complete the data interaction method in the foregoing embodiments.

The computer-readable storage medium may be a non-temporary computer-readable storage medium. For example, the non-temporary computer-readable storage medium may include a read-only memory (ROM), a random-access memory (RAM), a compact disc read-only memory (CD-ROM), a magnetic tape, a floppy disk, an optical data storage device, and the like.

The above descriptions are merely the preferred embodiments of the present disclosure and are not intended to limit the present disclosure. Any modification, equivalent replacement and improvement within the spirit and principle of the present disclosure should be contained in the protection scope of the present disclosure.

The invention claimed is:

1. A data interaction method, comprising:
obtaining, in response to receiving a parameter writing operation signal transmitted by a central processing unit, a first parameter from the central processing unit and storing the first parameter in a downlink buffer;
acquiring a second parameter from the downlink buffer and transmitting the second parameter to a data processing circuit unit, the second parameter being the first parameter;
processing data, by the data processing circuit unit, based on the second parameter to obtain output data corresponding to the second parameter, wherein processing the data comprises: compressing frame data to obtain image compression data and state information of the data processing circuit unit obtained during compressing the frame data;
storing, by the data processing circuit unit, the output data corresponding to the second parameter in an uplink buffer;
recording a quantity of output data stored in the uplink buffer;
transmitting, in response to that the quantity of the output data stored in the uplink buffer reaches an output quantity threshold, storage state information of the uplink buffer to trigger a data reading operation instruction, wherein the storage state information of the uplink buffer indicates that the uplink buffer is not capable of continuing to store subsequent new output data;
outputting all of the output data stored in the uplink buffer at one time to the central processing unit in response to the data reading operation instruction; and
determining, by the central processing unit, a fifth parameter to be configured to the data processing circuit unit according to the output data.

2. The data interaction method according to claim 1, further comprising:
recording a quantity of parameters stored in the downlink buffer;
deleting the second parameter from the downlink buffer after acquiring the second parameter from the downlink buffer and transmitting the second parameter to the data processing circuit unit;
transmitting first downlink storage state information in response to that the quantity of the parameters stored in the downlink buffer is increased from being smaller than an input quantity upper limit threshold to being greater than or equal to the input quantity upper limit threshold, wherein the first downlink storage state information indicates that the downlink buffer is not capable of continuing to store subsequent new parameters, and controls the central processing unit to stop transmitting the parameter writing operation signal so as to suspend parameter distributing; and
transmitting second downlink storage state information in response to that the quantity of the parameters stored in the downlink buffer is decreased from being greater than an input quantity lower limit threshold to being less than or equal to the input quantity lower limit threshold, wherein the second downlink storage state information indicates that the downlink buffer is capable of continuing to store subsequent new parameters, and controls the central processing unit to resume transmitting the parameter writing operation signal so as to resume parameter distributing.

3. The data interaction method according to claim 1, wherein the obtaining, in response to a parameter writing operation signal transmitted by a central processing unit, a first parameter and storing the first parameter in a downlink buffer comprises:
obtaining the first parameter in response to the parameter writing operation signal;
converting the parameter writing operation signal into an electrical writing signal of writing to the downlink buffer, wherein the parameter writing operation signal is based on a bus protocol; and
storing the first parameter in the downlink buffer based on the electrical writing signal.

4. The data interaction method according to claim 1, wherein
the downlink buffer is in a first input first output (FIFO) queue or a static random-access memory (SRAM).

5. The data interaction method according to claim 1, wherein the acquiring a second parameter from the downlink buffer and transmitting the second parameter to a data processing circuit unit comprises:
acquiring the second parameter from the downlink buffer, storing the second parameter in a ping-pong buffer, acquiring the second parameter from the ping-pong buffer, and transmitting the second parameter to the data processing circuit unit.

6. The data interaction method according to claim 5, wherein
the ping-pong buffer comprises two cache regions: a first cache region and a second cache region, the first cache region and the second cache region being configured to store parameters obtained from the downlink buffer respectively, the parameters stored in the first cache region being different from the parameters stored in the second cache region;
the acquiring the second parameter from the downlink buffer and storing the second parameter in a ping-pong buffer, acquiring the second parameter from the ping-pong buffer, and transmitting the second parameter to the data processing circuit unit, comprises:
acquiring the second parameter from the downlink buffer and storing the second parameter in the first cache region, in response to that the first cache region has not stored any parameters and in response to that the downlink buffer stores the second parameter; otherwise,
acquiring the second parameter from the downlink buffer and storing the second parameter in the second cache region, in response to that the second cache region has not stored any parameters and in response to that the downlink buffer stores the second parameter; and
acquiring the second parameter from the first cache region or acquiring the second parameter from the second cache region, and transmitting the second parameter to the data processing circuit unit.

7. The data interaction method according to claim 6, further comprising:
acquiring, in response to that the data processing circuit unit fails to process the data based on the second parameter acquired from the first cache region, the second parameter from the first cache region again and transmitting the second parameter to the data processing circuit unit;

deleting, in response to that the data processing circuit unit successfully processes the data based on the second parameter acquired from the first cache region, the second parameter in the first cache region from the first cache region, acquiring a third parameter currently stored in the second cache region, and transmitting the third parameter to the data processing circuit unit;

acquiring, in response to that the data processing circuit unit fails to process the data based on the second parameter acquired from the second cache region, the second parameter from the second cache region again and transmitting the second parameter to the data processing circuit unit; and deleting, in response to that the data processing circuit unit successfully processes the data based on the second parameter acquired from the second cache region, the second parameter in the second cache region from the second cache region, acquiring a fourth parameter currently stored in the first cache region, and transmitting the fourth parameter to the data processing circuit unit.

8. The data interaction method according to claim 1, wherein the outputting all of the output data stored in the uplink buffer at one time to the central processing unit in response to the data reading operation instruction comprises:

reading all of the output data from the uplink buffer at one time in response to the data reading operation instruction; and converting the output data read from the uplink buffer into a signal based on a bus protocol, and transmitting the signal through a bus.

9. An electronic device, comprising:

a processor; and a memory configured to store executable instructions of the processor, wherein the processor is configured to execute the executable instructions to perform the following operations:

obtaining, in response to receiving a parameter writing operation signal transmitted by a central processing unit, a first parameter from the central processing unit and storing the first parameter in a downlink buffer;

acquiring a second parameter from the downlink buffer and transmitting the second parameter to a data processing circuit unit, for the data processing circuit unit to process data based on the second parameter to obtain output data corresponding to the second parameter, the second parameter being the first parameter, wherein processing the data comprises: compressing frame data to obtain image compression data and state information of the data processing circuit unit obtained during compressing the frame data;

storing the output data corresponding to the second parameter in an uplink buffer;

recording a quantity of output data stored in the uplink buffer;

transmitting, in response to that the quantity of the output data stored in the uplink buffer reaches an output quantity threshold, storage state information of the uplink buffer to trigger a data reading operation instruction, wherein the storage state information of the uplink buffer indicates that the uplink buffer is not capable of continuing to store subsequent new output data; and outputting all of the output data stored in the uplink buffer at one time to the central processing unit in response to the data reading operation instruction, for the central processing unit to determine a fifth parameter to be configured to the data processing circuit unit according to the output data.

10. The electronic device according to claim 9, wherein the processor is further configured to execute the executable instructions to perform the following operations:

recording a quantity of parameters stored in the downlink buffer;

deleting the second parameter from the downlink buffer after acquiring the second parameter from the downlink buffer and transmitting the second parameter to the data processing circuit unit;

transmitting first downlink storage state information in response to that the quantity of the parameters stored in the downlink buffer is increased from being smaller than an input quantity upper limit threshold to being greater than or equal to the input quantity upper limit threshold, wherein the first downlink storage state information indicates that the downlink buffer is not capable of continuing to store subsequent new parameters, and controls the central processing unit to stop transmitting the parameter writing operation signal so as to suspend parameter distributing; and transmitting second downlink storage state information in response to that the quantity of the parameters stored in the downlink buffer is decreased from being greater than an input quantity lower limit threshold to being less than or equal to the input quantity lower limit threshold, wherein the second downlink storage state information indicates that the downlink buffer is capable of continuing to store subsequent new parameters, and controls the central processing unit to resume transmitting the parameter writing operation signal so as to resume parameter distributing.

11. The electronic device according to claim 9, wherein the processor is further configured to execute the executable instructions to perform the following operations:

obtaining the first parameter in response to the parameter writing operation signal;

converting the parameter writing operation signal into an electrical writing signal of writing to the downlink buffer, wherein the parameter writing operation signal is based on a bus protocol; and storing the first parameter in the downlink buffer based on the electrical writing signal.

12. The electronic device according to claim 9, wherein the downlink buffer is in a first input first output (FIFO) queue or a static random-access memory (SRAM).

13. The electronic device according to claim 9, wherein the processor is further configured to execute the executable instructions to perform the following operations:

acquiring the second parameter from the downlink buffer, storing the second parameter in a ping-pong buffer, acquiring the second parameter from the ping-pong buffer, and transmitting the second parameter to the data processing circuit unit.

14. The electronic device according to claim 13, wherein the ping-pong buffer comprises two cache regions: a first cache region and a second cache region, the first cache region and the second cache region being configured to store parameters obtained from the downlink buffer respectively, the parameters stored in the first cache region being different from the parameters stored in the second cache region;

the acquiring the second parameter from the downlink buffer and storing the second parameter in a ping-pong buffer, acquiring the second parameter from the ping-pong buffer, and transmitting the second parameter to the data processing circuit unit, comprises:
acquiring the second parameter from the downlink buffer and storing the second parameter in the first cache region in response to that the first cache region has not stored any parameters and in response to that the downlink buffer stores the second parameter; otherwise,
acquiring the second parameter from the downlink buffer and storing the second parameter in the second cache region in response to that the second cache region has not stored any parameters and in response to that the downlink buffer stores the second parameter; and
acquiring the second parameter from the first cache region or acquiring the second parameter from the second cache region, and transmitting the second parameter to the data processing circuit unit.

15. The electronic device according to claim 14, wherein the processor is further configured to execute the executable instructions to perform the following operations:
acquiring, in response to that the data processing circuit unit fails to process the data based on the second parameter acquired from the first cache region, the second parameter from the first cache region again and transmitting the second parameter to the data processing circuit unit;
deleting, in response to that the data processing circuit unit successfully processes the data based on the second parameter acquired from the first cache region, the second parameter in the first cache region from the first cache region, acquiring a third parameter currently stored in the second cache region, and transmitting the third parameter to the data processing circuit unit;
acquiring, in response to that the data processing circuit unit fails to process the data based on the second parameter acquired from the second cache region, the second parameter from the second cache region again and transmitting the second parameter to the data processing circuit unit; and
deleting, in response to that the data processing circuit unit successfully processes the data based on the second parameter acquired from the second cache region, the second parameter in the second cache region from the second cache region, acquiring a fourth parameter currently stored in the first cache region, and transmitting the fourth parameter to the data processing circuit unit.

16. The electronic device according to claim 9, wherein the processor is further configured to execute the executable instructions to perform the following operations:
reading all of the output data from the uplink buffer at one time in response to the data reading operation instruction; and
converting the output data read from the uplink buffer into a signal based on a bus protocol, and transmitting the signal through a bus.

17. A computer-readable storage medium, causing, when at least one instruction in the computer-readable storage medium is executed by a processor of an electronic device, the electronic device to perform the following operations:
obtaining, in response to receiving a parameter writing operation signal transmitted by a central processing unit, a first parameter from the central processing unit and storing the first parameter in a downlink buffer;
acquiring a second parameter from the downlink buffer and transmitting the second parameter to a data processing circuit unit, for the data processing circuit unit to process data based on the second parameter to obtain output data corresponding to the second parameter, the second parameter being the first parameter, wherein processing the data comprises: compressing frame data to obtain image compression data and state information of the data processing circuit unit obtained during compressing the frame data;
storing the output data corresponding to the second parameter in an uplink buffer;
recording a quantity of output data stored in the uplink buffer;
transmitting, in response to that the quantity of the output data stored in the uplink buffer reaches an output quantity threshold, storage state information of the uplink buffer to trigger a data reading operation instruction, wherein the storage state information of the uplink buffer indicates that the uplink buffer is not capable of continuing to store subsequent new output data; and
outputting all of the output data stored in the uplink buffer at one time to the central processing unit in response to the data reading operation instruction, for the central processing unit to determine a fifth parameter to be configured to the data processing circuit unit according to the output data.

18. The computer-readable storage medium according to claim 17, further causing, when the at least one instruction in the computer-readable storage medium is executed by the processor of the electronic device, the electronic device to perform the following operations:
recording a quantity of parameters stored in the downlink buffer;
deleting the second parameter from the downlink buffer after acquiring the second parameter from the downlink buffer and transmitting the second parameter to the data processing circuit unit;
transmitting first downlink storage state information in response to that the quantity of the parameters stored in the downlink buffer is increased from being smaller than an input quantity upper limit threshold to being greater than or equal to the input quantity upper limit threshold, wherein the first downlink storage state information indicates that the downlink buffer is not capable of continuing to store subsequent new parameters, and controls the central processing unit to stop transmitting the parameter writing operation signal so as to suspend parameter distributing; and
transmitting second downlink storage state information in response to that the quantity of the parameters stored in the downlink buffer is decreased from being greater than an input quantity lower limit threshold to being less than or equal to the input quantity lower limit threshold, wherein the second downlink storage state information indicates that the downlink buffer is capable of continuing to store subsequent new parameters, and controls the central processing unit to resume transmitting the parameter writing operation signal so as to resume parameter distributing.

19. The computer-readable storage medium according to claim 17, wherein the obtaining, in response to a parameter writing operation signal transmitted by a central processing unit, a first parameter and storing the first parameter in a downlink buffer comprises:
obtaining the first parameter in response to the parameter writing operation signal;
converting the parameter writing operation signal into an electrical writing signal of writing to the downlink buffer, wherein the parameter writing operation signal is based on a bus protocol; and storing the first parameter in the downlink buffer based on the electrical writing signal.

20. The computer-readable storage medium according to claim 17, wherein the downlink buffer is in a first input first output (FIFO) queue or a static random-access memory (SRAM).

\* \* \* \* \*